(12) United States Patent
Kimura et al.

(10) Patent No.: US 8,064,022 B2
(45) Date of Patent: Nov. 22, 2011

(54) LIQUID CRYSTAL DISPLAY DEVICE AND METHOD OF MANUFACTURING THE SAME

(75) Inventors: Yohei Kimura, Ishikawa (JP);
Toshiyuki Higano, Ishikawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 331 days.

(21) Appl. No.: 12/355,111

(22) Filed: Jan. 16, 2009

(65) Prior Publication Data

US 2010/0182555 A1 Jul. 22, 2010

(51) Int. Cl.
*G02F 1/1343* (2006.01)
*G02F 1/1337* (2006.01)
*G02F 1/13* (2006.01)
*H01L 21/00* (2006.01)

(52) U.S. Cl. ........... 349/126; 349/139; 349/187; 438/30
(58) Field of Classification Search .................. 349/141, 349/42, 43, 46, 187, 123, 122, 132, 134, 349/138, 140, 143, 144, 139, 126; 438/30
See application file for complete search history.

(56) References Cited

U.S. PATENT DOCUMENTS

| | | | |
|---|---|---|---|
| 2007/0139598 A1* | 6/2007 | Choi et al. | 349/139 |
| 2007/0225096 A1* | 9/2007 | Fujita | 474/202 |
| 2007/0229748 A1* | 10/2007 | Fujita | 349/141 |
| 2009/0109391 A1* | 4/2009 | Ito et al. | 349/141 |
| 2009/0128727 A1* | 5/2009 | Yata | 349/46 |
| 2010/0182555 A1* | 7/2010 | Kimura et al. | 349/126 |

FOREIGN PATENT DOCUMENTS

| | | |
|---|---|---|
| JP | 2005-107535 | 4/2005 |
| JP | 2006-139295 | 6/2006 |

OTHER PUBLICATIONS

U.S. Appl. No. 12/396,666, filed Mar. 3, 2009, Higano, et al.
U.S. Appl. No. 12/335,018, Dec. 15, 2008, Kimura, et al.

* cited by examiner

*Primary Examiner* — Brian Healy
(74) *Attorney, Agent, or Firm* — Oblon, Spivak, McClelland, Maier & Neustadt, L.L.P.

(57) ABSTRACT

A liquid crystal display device includes a liquid crystal display panel which is configured to hold a liquid crystal layer between an array substrate and a counter-substrate. The array substrate includes a pixel electrode which is connected to a switching element, and a counter-electrode which is opposed to the pixel electrode via an interlayer insulation film. The pixel electrode includes a plurality of slits. The slit is formed in a substantially parallelogrammatic shape, and includes, at a corner portion with an acute interior angle, an arcuate recess portion which is recessed toward an outside of an edge.

6 Claims, 6 Drawing Sheets

LIQUID CRYSTAL DISPLAY DEVICE AND METHOD OF MANUFACTURING THE SAME

BACKGROUND OF THE INVENTION

1. Field of the Invention

The present invention relates to a liquid crystal display device of a transverse electric field driving mode, and a method of manufacturing a pixel electrode which is applied to this liquid crystal display device.

2. Description of the Related Art

In recent years, flat-panel display devices have vigorously been developed, and liquid crystal display devices, above all, have attracted attention because of advantages of light weight, small thickness and low power consumption. In particular, in an active matrix liquid crystal display device in which a switching element is provided in each of pixels, attention has been paid to the structure which makes use of a transverse electric field (including a fringe electric field) of an in-plane switching (IPS) mode or a fringe field switching (FFS) mode (see, for instance, Jpn. Pat. Appln. KOKAI Publication No. 2005-107535 and Jpn. Pat. Appln. KOKAI Publication No. 2006-139295).

The liquid crystal display device of such a transverse electric field driving mode includes a pixel electrode and a counter-electrode which are formed on an array substrate and are opposed via an interlayer insulation film, and liquid crystal molecules are switched by generating a transverse electric field that is substantially parallel to the major surface of the array substrate. In addition, polarizer plates, which are disposed such that their absorption axes intersect at right angles, are disposed on the outer surfaces of the array substrate and the counter-substrate.

By this disposition of the polarizer plates, the display of a black screen is realized, for example, at a time of non-application of voltage. With the application of a voltage corresponding to a video signal to the pixel electrode, the transmittance (modulation ratio) gradually increases and the display of a white screen is realized. In this liquid crystal display device, the liquid crystal molecules rotate in a plane that is substantially parallel to the major surface of the substrate. Thus, since the polarization state is not greatly affected by the direction of incidence of transmissive light, there is the feature that the viewing angle dependency is low and a wide viewing angle characteristic is obtained.

In particular, in the FFS mode liquid crystal display device, the pixel electrode is disposed to be opposed to a counter-electrode via an interlayer insulation film. The pixel electrode has a slit which is opposed to the counter-electrode. The liquid crystal molecules are driven by an electric field which is generated between the pixel electrode and the counter-electrode via the slit.

In the pixel electrode having this shape, there may be a case in which the directions of electric fields are not uniform in the vicinity of both end portions of the slit. Hence, in the vicinity of both end portions of the slit, the directions of alignment of liquid crystal molecules, which are driven by electric fields in non-uniform directions, also become non-uniform. Specifically, at a time of voltage application (at a time of white screen display), an alignment defect of liquid crystal molecules occurs in the vicinity of both end portions of the slit, and the transmittance in this part (domain) lowers, resulting in a dark line. There is a tendency that the domain in which such an alignment defect has occurred grows along the edges of the slit, and a further decrease in transmittance may occur. Thus, there is such a problem that an adequately high luminance cannot be obtained when a white screen is displayed.

BRIEF SUMMARY OF THE INVENTION

The object of the present invention is to provide a liquid crystal display device which can improve the transmittance and can display an image with good display quality, and a method of manufacturing the same.

According to an aspect of the present invention, there is provided a liquid crystal display device comprising a liquid crystal display panel which is configured to hold a liquid crystal layer between a first substrate and a second substrate, the first substrate including: a scanning line extending in a row direction of pixels; a signal line extending in a column direction of the pixels; a switching element disposed in each of the pixels; a first electrode disposed in each of the pixels; a second electrode which is disposed on the liquid crystal layer side of the first electrode, includes a plurality of slits which are opposed to the first electrode via an interlayer insulation film, and is connected to the switching element; and an alignment film which is in contact with the liquid crystal layer, wherein the slit is formed in a substantially parallelogrammatic shape, and includes, at a corner portion with an acute interior angle, an arcuate recess portion which is recessed toward an outside of an edge.

According to another aspect of the present invention, there is provided a method of manufacturing a liquid crystal display device of a transverse electric field driving mode, comprising: a step of forming an interlayer insulation film on a first electrode; a step of forming an electrically conductive layer on the interlayer insulation film; a step of forming a resist on the electrically conductive layer; a step of exposing the resist via a photomask having a pattern corresponding to a second electrode; a step of developing the resist; and a step of removing the electrically conductive layer which is exposed through the resist, wherein the photomask has a pattern corresponding to a plurality of parallelogrammatic slits, and has a correction pattern which projects to an outside of an edge at a part overlapping a corner portion of the slit, which has an acute interior angle, and a slit including an arcuate recess portion, which is recessed toward an outside of an edge, is formed in the second electrode.

The present invention can provide a liquid crystal display device which can improve the transmittance and can display an image with good display quality, and a method of manufacturing the same.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A liquid crystal display device according to an embodiment of the present invention and a manufacturing method thereof will now be described with reference to the accompanying drawings. An FFS mode liquid crystal display device is described below as an example of a liquid crystal display device of a liquid crystal mode in which a pixel electrode and a counter-electrode are provided on one of substrates and liquid crystal molecules are switched by mainly using a transverse electric field (or a horizontal electric field that is substantially parallel to the substrate) that is produced between the pixel electrode and the counter-electrode.

Figure 1:
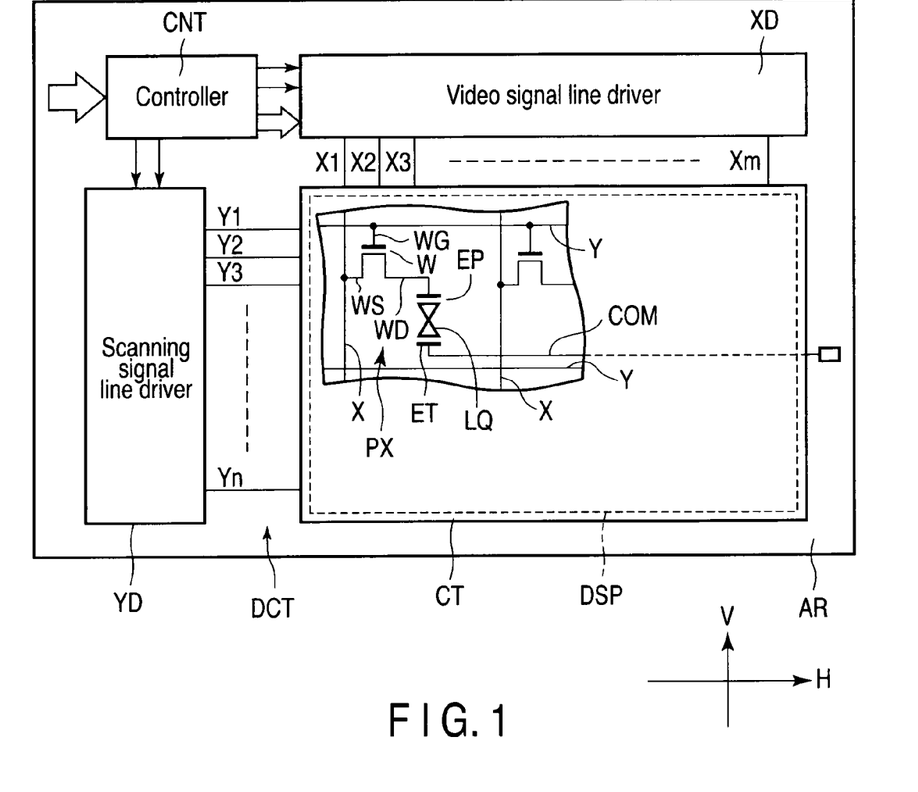
FIG. 1 schematically shows the structure of a liquid crystal display device of a liquid crystal mode which makes use of a transverse electric field according to an embodiment of the present invention.
Figure 2:
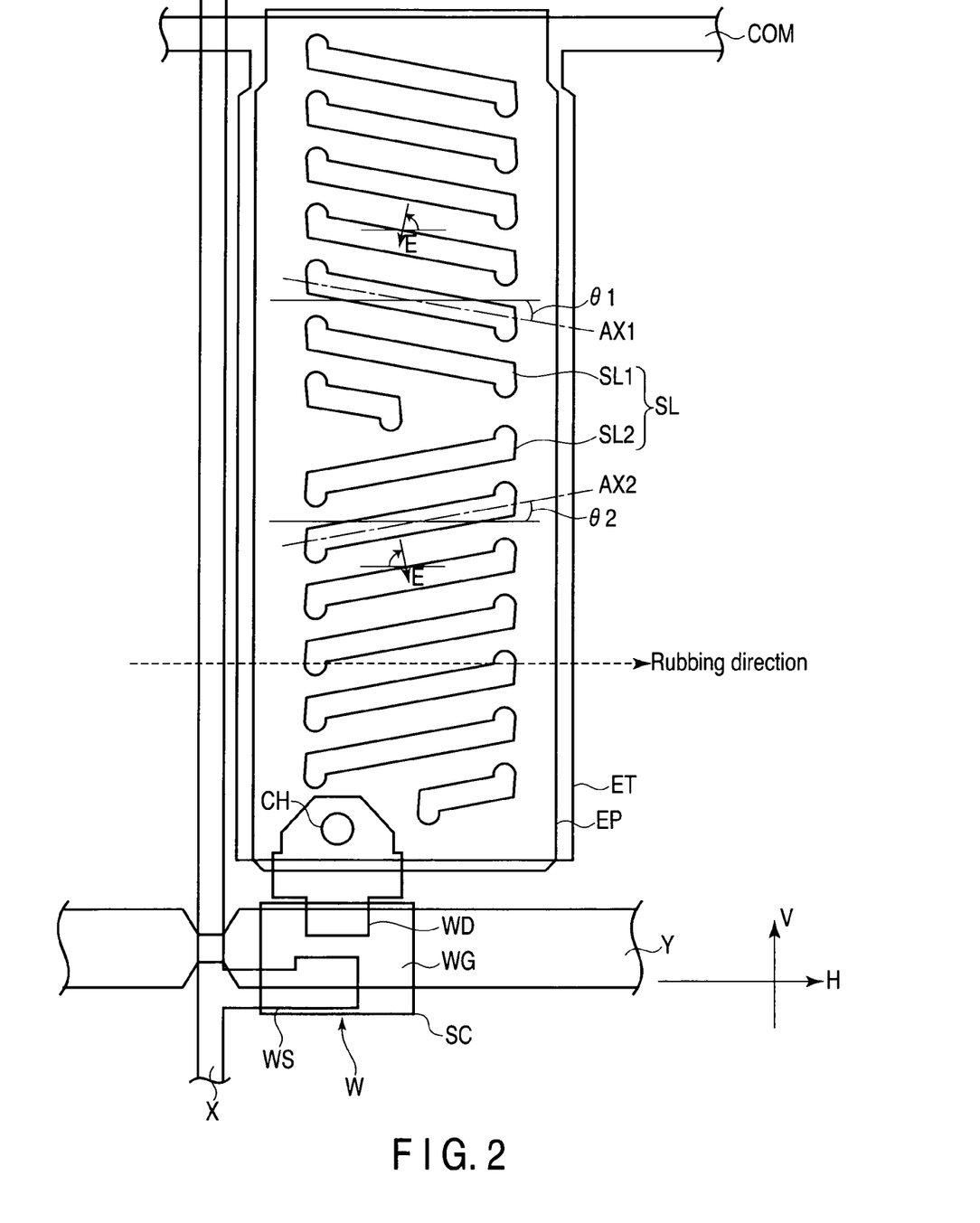
FIG. 2 is a plan view that schematically shows the structures of a pixel electrode and a counter-electrode of one pixel in the present embodiment.
Figure 3:
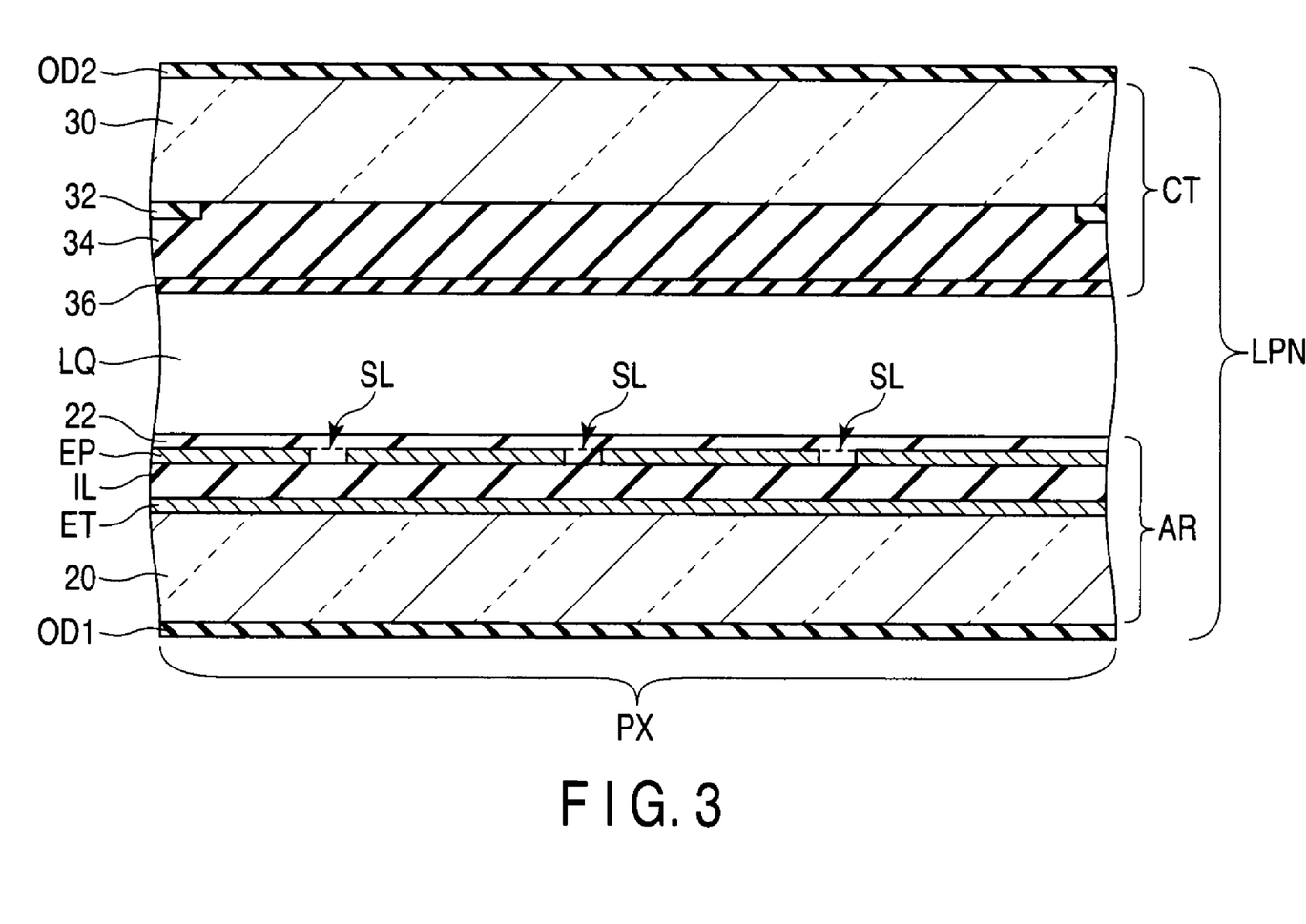
FIG. 3 schematically shows a cross-sectional structure of a liquid crystal display panel, at a time when the array substrate shown in FIG. 2 is cut along line III-III.

As is shown in FIG. 1 to FIG. 3, the liquid crystal display device is an active matrix type liquid crystal display device, and includes a liquid crystal display panel LPN. The liquid crystal display panel LPN includes an array substrate (first substrate) AR, a counter-substrate (second substrate) CT which is disposed to be opposed to the array substrate AR, and a liquid crystal layer LQ which is held between the array substrate AR and the counter-substrate CT. This liquid crystal display device includes a display area DSP which displays an image. The display area DSP is composed of a plurality of pixels PX which are arrayed in a matrix of m×n (m and n are positive integers).

The array substrate AR is formed by using an insulating substrate 20 with light transmissivity, such as a glass plate or a quartz plate. Specifically, the array substrate AR includes, in the display area DSP, an (m×n) number of pixel electrodes (second electrodes) EP which are disposed in association with the respective pixels PX; an n-number of scanning lines Y (Y1 to Yn) which extend in a row direction H of the pixels PX; an m-number of signal lines X (X1 to Xm) which extend in a column direction V of the pixels PX; an (m×n) number of switching elements W which are disposed in regions including intersections between the scanning lines Y and signal lines X in the respective pixels PX; and a counter-electrode ET which is disposed to be opposed to the pixel electrodes EP via an insulation film IL.

The array substrate AR further includes, in a driving circuit region DCT around the display area DSP, at least a part of a scanning line driver YD which is connected to the n-number of scanning lines Y, and at least a part of a signal line driver XD which is connected to the m-number of signal lines X.

The scanning line driver YD successively supplies a scanning signal (driving signal) to the n-number of scanning lines Y on the basis of the control by a controller CNT. The signal line driver XD supplies video signals (driving signals) to the m-number of signal lines X on the basis of the control by the controller CNT at a timing when the switching elements W of each row are turned on by the scanning signal. Thereby, the pixel electrodes EP of each row are set at pixel potentials corresponding to the video signals that are supplied via the associated switching elements W.

Each of the switching elements W is composed of, e.g. a thin-film transistor. A semiconductor layer SC of the switching element W can be formed of, e.g. polysilicon or amorphous silicon. A gate electrode WG of the switching element W is electrically connected to the scanning line Y (or the gate electrode WG is formed integral with the scanning line Y). A source electrode WS of the switching element W is electrically connected to the signal line X (or the source electrode WS is formed integral with the signal line X) and is put in contact with a source region of the semiconductor layer SC. A drain electrode WD of the switching element W is connected to the pixel electrode EP via a contact hole CH and is put in contact with a drain region of the semiconductor layer SC.

The counter-electrode ET is disposed, for example, in an island shape in each of the pixels PX, and is electrically connected to a common wiring line COM of a common potential. The counter-electrode ET is covered with the interlayer insulation film IL. The pixel electrode EP is disposed on the interlayer insulation film IL so as to be opposed to the counter-electrode ET. A plurality of slits SL, which are opposed to the counter-electrode ET, are formed in the pixel electrode EP. The pixel electrode EP and counter-electrode ET are formed of a light-transmissive, electrically conductive material such as indium tin oxide (ITO) or indium zinc oxide (IZO). That surface of the array substrate AR, which is in contact with the liquid crystal layer LQ, is covered with an alignment film 22.

On the other hand, the counter-substrate CT is formed by using a light-transmissive, insulating substrate 30, such as a glass plate or a quartz plate. In particular, in a color-display-type liquid crystal display device, as shown in FIG. 3, the counter-substrate CT includes, on an inner surface of the insulating substrate 30, that is, on a surface opposed to the liquid crystal layer LQ, a black matrix 32 which divides the pixels PX, and a color filter layer 34 which is disposed in each pixel which is surrounded by the black matrix 32. In addition, the counter-substrate CT may be configured to include a shield electrode for reducing the effect of an external electric field, and an overcoat layer which is disposed with such a relatively large film thickness as to planarize irregularities on the surface of the color filter layer 34.

The black matrix 32 is disposed on the insulating substrate 30 so as to be opposed to the scanning lines Y and signal lines X and wiring portions of the switching elements W, etc., which are provided on the array substrate AR. The color filter layer 34 is disposed on the insulating substrate 30 and is formed of color resins of different colors, for example, the three primary colors of red, blue and green. The red color resin, blue color resin and green color resin are disposed in association with the red pixel, blue pixel and green pixel, respectively. That surface of the counter-substrate CT, which is in contact with the liquid crystal layer LQ, is covered with an alignment film 36.

The above-described counter-substrate CT and array substrate AR are disposed such that their alignment films 22 and 36 are opposed to each other. At this time, a predetermined gap is created by spacers (not shown) between the array substrate AR and the counter-substrate CT. The liquid crystal layer LQ is formed of a liquid crystal composition including liquid crystal molecules which are sealed in the gap that is created between the alignment film 22 of the array substrate AR and the alignment film 36 of the counter-substrate CT.

In addition, the liquid crystal display device includes an optical element OD1 which is provided on one of outer surfaces of the liquid crystal display panel LPN (i.e. that surface of the array substrate AR, which is opposite to the surface thereof that is in contact with the liquid crystal layer LQ), and an optical element OD2 which is provided on the other outer surface of the liquid crystal display panel LPN (i.e. that surface of the counter-substrate CT, which is opposite to the surface thereof that is in contact with the liquid crystal layer LQ). Each of the optical elements OD1 and OD2 includes a polarizer plate. These polarizer plates are disposed such that their absorption axes intersect at right angles. Thereby, for example, a normally black mode is realized, in which the transmittance of the liquid crystal panel LPN decreases to a minimum (i.e. a black screen is displayed) at a time of no electric field when no voltage is applied to the liquid crystal layer LQ.

In this structure, backlight from a backlight unit, which is disposed on the array substrate AR side of the liquid crystal display panel LPN, is selectively transmitted through the liquid crystal display panel LPN, and an image is displayed.

In the present embodiment, the slits SL, which are formed in the pixel electrode EP, extend substantially along the row direction H, for example, as shown in FIG. 2, and are formed to cross the row direction H at an acute angle. In addition, these slits SL are arranged in the column direction V.

Furthermore, in order to improve the viewing angle characteristics of hue, such configuration is adopted that liquid crystal molecules having different switching directions are included in one pixel. Specifically, one pixel electrode EP has slits SL extending in at least two directions.

For example, a plurality of slits SL1 each having a major axis AX1 in a first direction and a plurality of slits SL2 each having a major axis AX2 in a second direction, which differs from the first direction, are formed in the pixel electrode EP. The plural slits SL1 are disposed in parallel to each other. The plural slits SL2 are disposed in parallel to each other.

The major axis AX1 of the slit SL1 is inclined at an angle θ1 of about 7 degrees to the row direction H. In addition, the major axis AX2 of the slit SL2 is inclined at an angle θ2 of about 7 degrees to the row direction H. Thus, the slits SL1 and the slits SL2 are disposed substantially line-symmetric with respect to the row direction H. The rubbing direction of each of the alignment film 22 and alignment film 36 is parallel to the row direction H.

Figure 4:
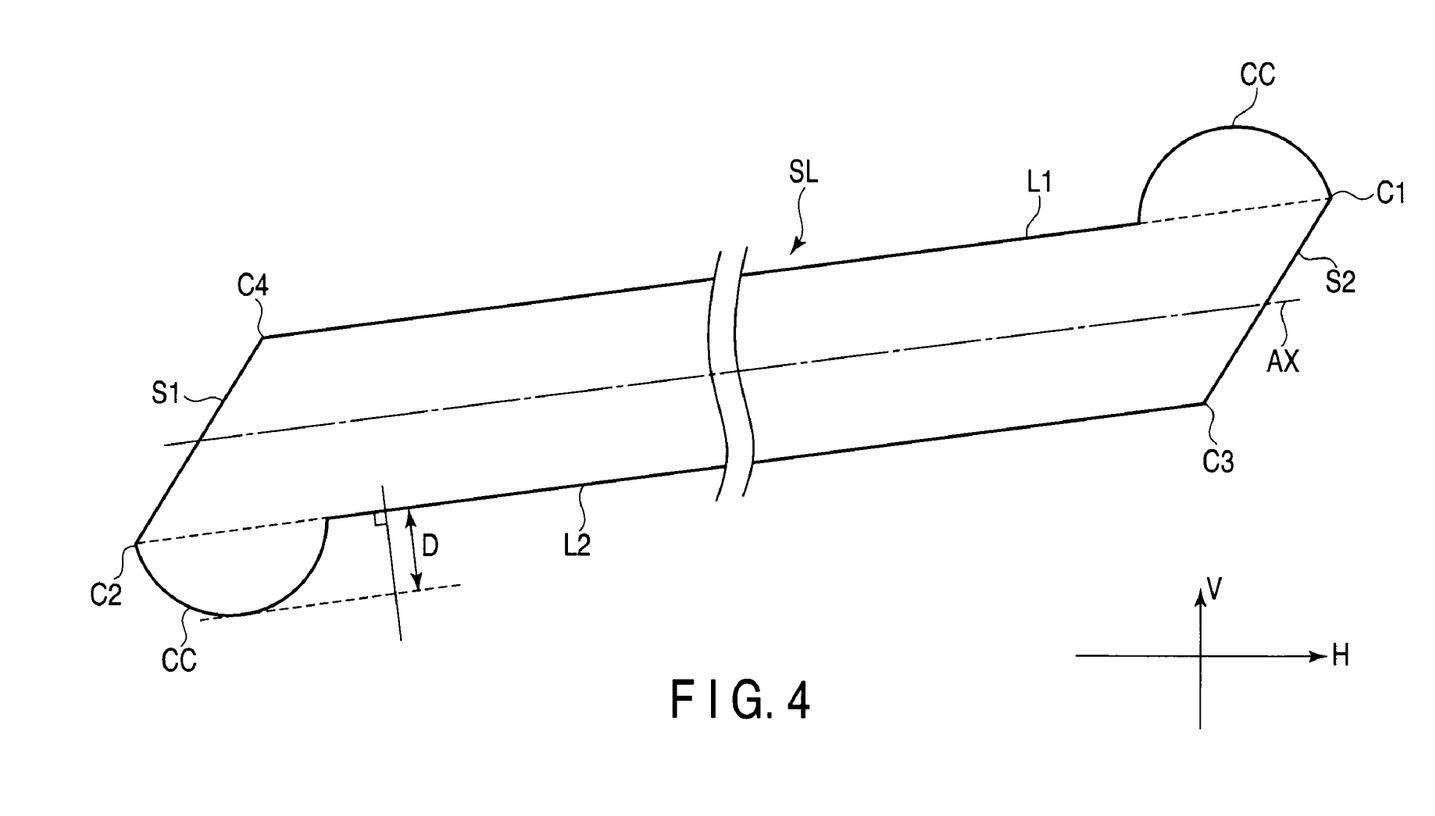
FIG. 4 is an enlarged view of a slit of the pixel electrode in the embodiment.

As shown in FIG. 4 in enlarged scale, each slit SL is formed in a substantially parallelogrammatic shape. Specifically, the edges, which define each slit SL, include two long sides L1 and L2 which are parallel to the major axis AX, and two short sides S1 and S2 which connect the long sides L1 and L2 and are parallel to each other. In the parallelogrammatic slit SL, two corner portions C1 and C2, which have acute interior angles, are formed on a diagonal. The other corner portions C3 and C4 have obtuse interior angles.

Each of the slits SL has arcuate recess portions CC at the corner portions C1 and C2 each having the acute interior angle. Specifically, in each slit SL, the arcuate recess portion CC, which is recessed toward the outside of the long side L1, is formed at the corner portion C1 at which the long side L1 and short side S2 intersect. In addition, the arcuate recess portion CC, which is recessed toward the outside of the long side L2, is formed at the corner portion C2 at which the long side L2 and short side S1 intersect.

In this parallelogrammatic slit SL, the recess portions CC, which extend in mutually opposite directions, are formed at the corner portions C1 and C2 on the diagonal. Accordingly, the slit SL is formed in a substantially "S" shape or a substantially "∫" (sign of integration) shape.

In the above-described structure, in the case where no electric field is generated between the pixel electrode EP and the counter-electrode ET, the liquid crystal molecules included in the liquid crystal layer LQ are aligned in parallel to the rubbing direction by the restrictive force that is caused by the alignment film 22 and alignment film 36. In this state, backlight, which has passed through the liquid crystal display panel LPN, is absorbed by the polarizer plate that is included in the optical element OD2 (i.e. a black screen is displayed).

On the other hand, in the case where a potential difference is created between the pixel electrode EP and the counter-electrode ET, an electric field E, which is perpendicular to the edges (including short sides and long sides) of the slit SL, is produced via the slit SL. By the electric field E, the liquid crystal molecules are switched. Specifically, the liquid crystal molecules are so driven as to be aligned in parallel to the electric field E. At this time, in the vicinity of the slit SL1, the liquid crystal molecules rotate in a left-hand direction (counterclockwise). In addition, in the vicinity of the slit SL2, the liquid crystal molecules rotate in a right-hand direction (clockwise). In this state, the backlight, when having passed through the liquid crystal display panel, is affected by the birefringence of liquid crystal molecules and is modulated, and at least a partial component of the backlight passes through the polarizer plate that is included in the optical element OD2 (i.e. a white screen is displayed). In addition, since the slits SL 1 and SL 2, which extend in the two directions, are formed in the pixel electrode EP, the in-plane rotational direction (left-hand rotation) of liquid crystal molecules corresponding to the shape of the slits SL1 is opposite to the rotational direction (right-hand rotation) of liquid crystal molecules corresponding to the shape of the slits SL2. Thus, the coloring, which depends on the observation direction of the liquid crystal display panel LPN, can be compensated. Therefore, a good display quality can be obtained over a wide viewing angle range.

The advantageous effects by the structure of the present embodiment are described.

In the above-described structure in which the liquid crystal molecules are driven by the electric field that is produced between the pixel electrode EP and the counter-electrode ET via the slits SL, the directions of electric fields are, in some cases, non-uniform in the vicinity of both end portions of the slit. Accordingly, the alignment directions of liquid crystal molecules, which are driven by the electric fields in non-uniform directions, become non-uniform. Such an alignment defect of liquid crystal molecules causes a decrease in transmittance, and there is a tendency that such an alignment defect grows along the edges of the slit.

The inventor paid attention to the fact that when the substantially parallelogrammatic slit SL is formed, alignment defects conspicuously appear at the corner portions C1 and C2 with acute interior angles. In connection with this, the inventor found that the occurrence of alignment defects is suppressed by reducing the non-uniformity of directions of electric fields at the corner portions C1 and C2 with acute interior angles.

In addition, the inventor paid attention to the fact that an alignment defect grows along the long sides L1 and L2, which are parallel to the major axis AX of the slit SL, from the corner portions C1 and C2 of the slit SL as base points. In connection with this, the inventor found that even if an alignment defect occurs, arcuate recess portions CC, which are recessed toward the outside of the long sides L1 and L2 of the slit SL at the corner portions C1 and C2, are proper as structures for suppressing the growth of the alignment defect.

Specifically, at the part of the slit SL where the interior angle is an acute angle, the straight edges, that is, the long side and short side, intersect. Thus, an electric field, which is produced via one of these edges, and an electric field, which is produced via the other edge, are mixed, and an alignment defect tends to easily occur. By contrast, at an arcuate edge, the variation of the direction of electric field is gentle, and the occurrence of an alignment defect can be suppressed, compared to the edge shape with an acute angle. In addition, since the arcuate recess portions CC are recessed toward the outside of the long sides L1 and L2, even if an alignment defect occurs at the recess portions CC, intersections between the arcuate edges, which form the recess portions CC, and the straight edges, become barriers, thus being able to prevent the alignment defect in the recess portions CC from growing along the long sides L1 and L2.

According to various studies by the inventor, it was confirmed that the recess portion CC should preferably be recessed from the long side L1, L2 by a range between 1.2 μm to 2.0 μm. Specifically, if a recess amount D from the long side L1, L2 is less than 1.0 μm, an adequate effect cannot be obtained in order to suppress the growth of the alignment defect. If the recess amount D from the long side L1, L2 is 1.0 μm or more, an adequate effect for suppressing the growth of the alignment defect can be obtained. However, if the recess amount D from the long side L1, L2 exceeds 2.0 μm, an adequate distance from the adjacent slit SL cannot be secured. Thus, the above-described range is preferable. As shown in FIG. 4, the recess amount D corresponds to the distance between the long side L1, L2 and the apex of the recess portion CC in a direction perpendicular to the long side L1, L2.

In addition, the inventor found that in the case where the substantially parallelogrammatic slit SL is formed, the influence of the non-uniformity of the directions of electric fields at the corner portions C3 and C4 with obtuse interior angles is small. Thus, the slit SL is formed in a substantially "S" shape or a substantially "∫" (sign of integration) shape. If recess portions CC are provided at the corner portions C1 and C2 with acute interior angles and at the corner portions C3 and C4 with obtuse interior angles in the slit SL, the neighboring slits SL, in some case, are connected due to the limit of resolution at the time of patterning. It is thus necessary to keep an adequately wide distance between the neighboring slits SL. This means that the number of slits, which can be formed in one pixel, decreases, and the transmittance may possibly decrease. Thus, the transmittance can be improved by applying the slit SL having the shape that was found by the inventor.

Therefore, the transmittance at the time of voltage application (at the time of white display) can be improved, and an image with good display quality can be displayed.

The pixel electrode EP having the above-described slit SL can be fabricated by the forming process as described below.

Figure 5A:
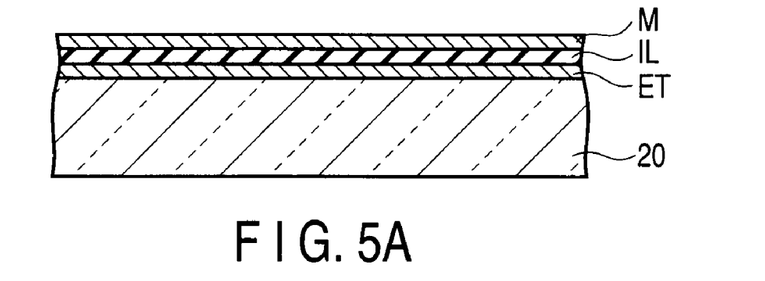
FIG. 5A is a view for describing a fabrication step of the pixel electrode, illustrating a film formation step of an electrically conductive layer.
Figure 5B:
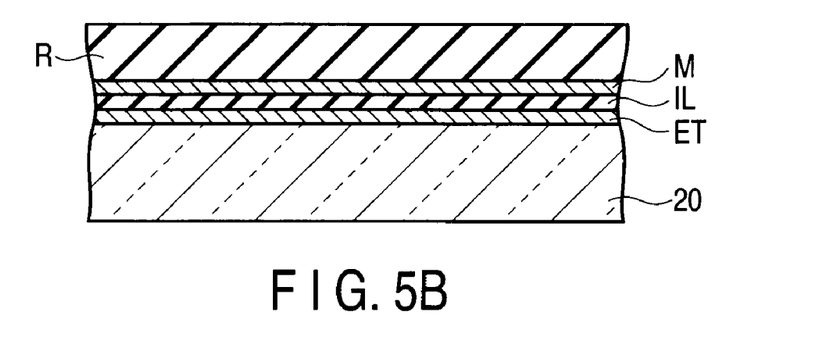
FIG. 5B is a view for describing a fabrication step of the pixel electrode, illustrating a film formation step of a resist.

Specifically, as shown in FIG. 5A, after an interlayer insulation film IL is formed on a counter-electrode ET, an electrically conductive layer M is formed on the interlayer insulation film IL. ITO, for instance, was used as the electrically conductive layer M. Then, as shown in FIG. 5B, a resist R, which is formed of a photosensitive resin material, is formed on the electrically conductive layer M. As the resist R, for example, use is made of a positive-type photosensitive resin material which is made soluble by exposure to light.

Figure 5C:
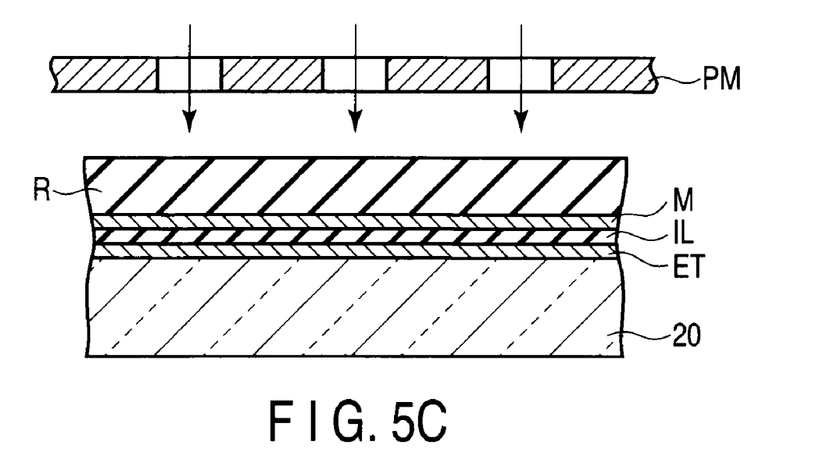
FIG. 5C is a view for describing a fabrication step of the pixel electrode, illustrating an exposure step of the resist.
Figures 5D, 5E:
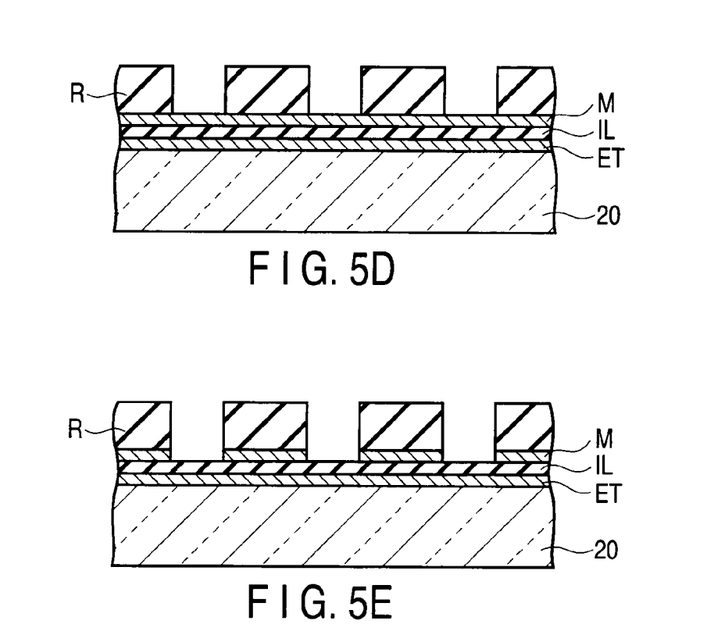
FIG. 5D is a view for describing a fabrication step of the pixel electrode, illustrating a development step of the resist.
FIG. 5E is a view for describing a fabrication step of the pixel electrode, illustrating a removal step of the electrically conductive layer.

Then, as shown in FIG. 5C, the resist R is exposed via a photomask PM. The photomask PM employed here has a light-shield pattern corresponding to at least the pixel electrode EP. Subsequently, as shown in FIG. 5D, the resist R is developed. Thereby, a resist R having a pattern corresponding to at least the pixel electrode EP is left.

Figure 5F:
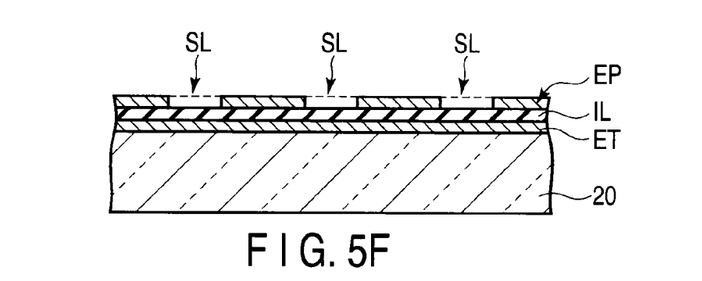
FIG. 5F is a view for describing a fabrication step of the pixel electrode, illustrating a removal step of the resist.

Following the above, as shown in FIG. 5E, the electrically conductive layer M, which is exposed through the resist R, is removed. A wet etching process or a dry etching process, for instance, is applicable in removing the electrically conductive layer M. Thereby, the electrically conductive layer M having the pattern corresponding to at least the pixel electrode EP is left. Thereafter, as shown in FIG. 5F, the resist R on the electrically conductive layer M is removed, and the pixel electrode EP is formed.

In the series of photolithography process steps, the photomask PM that is applied to the exposure step of the resist R has a light-transmissive pattern corresponding to a plurality of parallelogrammatic slits SL, and also has a correction pattern projecting toward the outside of the edge at the part overlapping the corner portion with an acute interior angle of the slit SL.

Specifically, in the case where the series of photolithography process steps are applied by using the photomask having, for instance, an angular pattern, such as a rectangular pattern, in order to form the electrode, the complete electrode tends to have a round shape due to the influence of the exposure condition in the resist exposure step, the development condition in the resist development step and the removal condition in the electrically conductive layer removal step.

Figure 6:
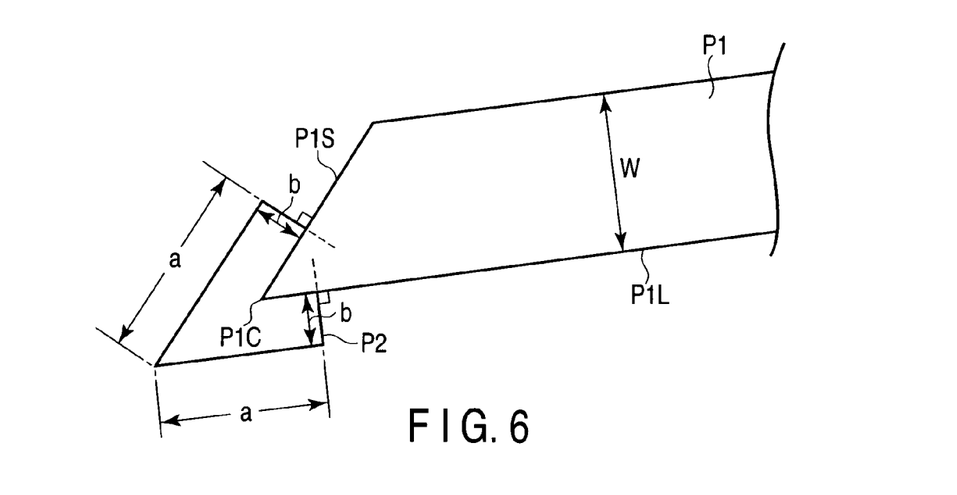
FIG. 6 is a view for explaining a slit pattern and a correction pattern, which are applied to a photomask, and optimal dimensions of the correction pattern.

In the present embodiment, as shown in FIG. 6, use is made of a photomask PM having a slit pattern P1 of the same shape as the parallelogram that is to be formed as the slit SL of the pixel electrode EP, and a correction pattern P2 of a substantially similar pattern to the corner portion that is disposed in a manner to project toward the outside of the edge at a part overlapping an acute-angled corner portion of the slit pattern P1. The slit pattern P1 and correction pattern P2 are light-transmissive patterns which pass light in the exposure step.

By performing the series of photolithography process step with use of the above-described photomask PM, arcuate recess portions CC are formed at the corner portions C1 and C2 of the slit SL, which have acute interior angles, in the completed pixel electrode EP. The width W of the slit pattern P1 was set at 5 μm.

In the above-described embodiment, the inventor conducted various studies on the optimal size of the correction pattern P2 that is applied to the photomask PM. It was concluded that the correction pattern P2 should preferably have a substantially similar shape to the corner portion CC, with the size of one side being 2.5 to 3.5 μm, and that the correction pattern P2 should preferably project from the edge of the slit pattern P1 by a range of 1.0 μm to 2.0 μm.

Specifically, as shown in FIG. 6, the correction pattern P2 is disposed so as to cover an acute-angled corner portion P1C of the parallelogrammatic slit pattern P1, and to project from an edge P1L of the slit pattern P1. In addition, the correction pattern P2 is disposed to project from an edge P1S of the slit pattern P1. At this time, the inventor performed patterning of the pixel electrode EP under the same condition by variously altering the length a of one side of the correction pattern P2 and the projection amount b of the correction pattern P2 from the edge P1L and P1S, and found the range of dimensions with which the optimal recess portion CC is formed.

The length of one side of the correction pattern P2 is the length of each of sides that are parallel to the edges P1L and P1S. In this example, the lengths of the sides, which are parallel to the edges P1L and P1S, are set to be equal. In addition, the projection amount b corresponds to the distance between the slit pattern P1 and the correction pattern P2 along the direction perpendicular to the edge P1L, P1S.

In particular, the projection amount b on the photomask PM becomes substantially equal to the recess amount D of the slit SL of the pixel electrode EP which is completed after the patterning. Thus, taking it into account that the recess portion CC should preferably be recessed from the edge L1, L2 of the slit SL by a range of 1.0 μm to 2.0 μm, it was confirmed that the projection amount b is similarly optimal in the range of 1.0 μm to 2.0 μm.

As has been described above, according to the liquid crystal display device of the present embodiment, the transmittance can be improved, and an image with good display quality, in particular, an image with high luminance in the case of displaying a white screen, can be displayed.

The present invention is not limited directly to the above-described embodiment. In practice, the structural elements can be modified and embodied without departing from the spirit of the invention. Various inventions can be made by properly combining the structural elements disclosed in the embodiment. For example, some structural elements may be omitted from all the structural elements disclosed in the embodiment. Furthermore, structural elements in different embodiments may properly be combined.

For example, the slit SL, which is formed in the pixel electrode EP, may have a shape that is elongated in a direction parallel to the signal line X, i.e. in the column direction V, or may have a shape that is elongated in a direction parallel to the scanning line Y, i.e. in the row direction H. In addition, all slits SL, which are formed in one pixel electrode EP, may be parallel.

The recess portions CC are not limited to the example shown in FIG. 4, in which the recess portions CC are recessed from the long sides L1 and L2 of the slit SL. The recess portions CC may partly be recessed toward the outside from the short sides S1 and S2 of the slit SL.

What is claimed is:

1. A liquid crystal display device characterized by comprising a liquid crystal display panel which is configured to hold a liquid crystal layer between a first substrate and a second substrate, the first substrate including:
   a scanning line extending in a row direction of pixels;
   a signal line extending in a column direction of the pixels;
   a switching element disposed in each of the pixels;
   a first electrode disposed in each of the pixels;
   a second electrode which is disposed on the liquid crystal layer side of the first electrode, includes a plurality of slits which are opposed to the first electrode via an interlayer insulation film, and is connected to the switching element; and
   an alignment film which is in contact with the liquid crystal layer,
   wherein the slit is formed in a substantially parallelogrammatic shape, and includes, at a corner portion with an acute interior angle, an arcuate recess portion which is recessed toward an outside of an edge.

2. The liquid crystal display device according to claim 1, characterized in that a rubbing direction of the alignment film is parallel to the row direction.

3. The liquid crystal display device according to claim 1, characterized in that the recess portion is recessed from an edge of the slit by a range of 1.0 μm to 2.0 μm.

4. A method of manufacturing a liquid crystal display device of a transverse electric field driving mode, characterized by comprising:
   a step of forming an interlayer insulation film on a first electrode;
   a step of forming an electrically conductive layer on the interlayer insulation film;
   a step of forming a resist on the electrically conductive layer;
   a step of exposing the resist via a photomask having a pattern corresponding to a second electrode;
   a step of developing the resist; and
   a step of removing the electrically conductive layer which is exposed through the resist,
   wherein the photomask has a pattern corresponding to a plurality of parallelogrammatic slits, and has a correction pattern which projects to an outside of an edge at a part overlapping a corner portion of the slit, which has an acute interior angle, and
   a slit including an arcuate recess portion, which is recessed toward an outside of an edge, is formed in the second electrode.

5. The method of manufacturing a liquid crystal display device, according to claim 4, characterized in that the correction pattern has a similar shape to the corner portion, with a size of one side being 2.5 to 3.5 μm.

6. The method of manufacturing a liquid crystal display device, according to claim 4, characterized in that the correction pattern projects from the edge of the slit by a range of 1.0 μm to 2.0 μm.

* * * * *